United States Patent [19]

Hufford

[11] Patent Number: 5,040,580

[45] Date of Patent: Aug. 20, 1991

[54] FIXTURE FOR HOLDING A WORKPIECE AND GUIDING A ROUTER OR THE LIKE

[76] Inventor: Charles R. Hufford, 215 S. 10th St., Rochelle, Ill. 61068

[21] Appl. No.: 615,470

[22] Filed: Nov. 19, 1990

[51] Int. Cl.⁵ .............................................. B27C 5/10
[52] U.S. Cl. .................... 144/144 R; 33/562; 144/134 D; 144/372; 144/144.5 R; 409/124; 409/130
[58] Field of Search ........... 144/144 R, 144 S, 134 D, 144/136 C, 372, 137; 409/121, 124, 125, 130, 182, 96; 33/197, 18.2, 562

[56] References Cited

U.S. PATENT DOCUMENTS

| | | | |
|---|---|---|---|
| 1,750,594 | 3/1930 | Henkes | 409/124 |
| 3,099,299 | 7/1963 | Gilfry | 144/144 |
| 3,434,385 | 3/1969 | Ray | 409/182 |
| 3,581,787 | 6/1971 | Bane | 144/134 |
| 4,095,633 | 6/1978 | Kimball et al. | 144/144 |
| 4,299,263 | 11/1981 | Skinner | 144/144 |
| 4,921,023 | 5/1990 | Pempek | 144/136 |

Primary Examiner—W. Donald Bray
Attorney, Agent, or Firm—Leydig, Voit & Mayer

[57] ABSTRACT

A workpiece is clamped to the upper side of a horizontal base. An upper plate is spaced above the workpiece and is supported on the base to move downwardly toward and upwardly away from the workpiece. The plate is transparent and defines a surface upon which a pattern to be cut into the workpiece may be drawn. A plunge-type router is located between the workpiece and the plate and includes an upper stylus which engages the lower side of the plate. By moving the router horizontally so as to cause the stylus to follow the pattern, the design of the pattern may be cut in the workpiece. When the router is plunged downwardly and retracted upwardly, the plate follows the plunger and remains in engagement with the stylus.

9 Claims, 2 Drawing Sheets

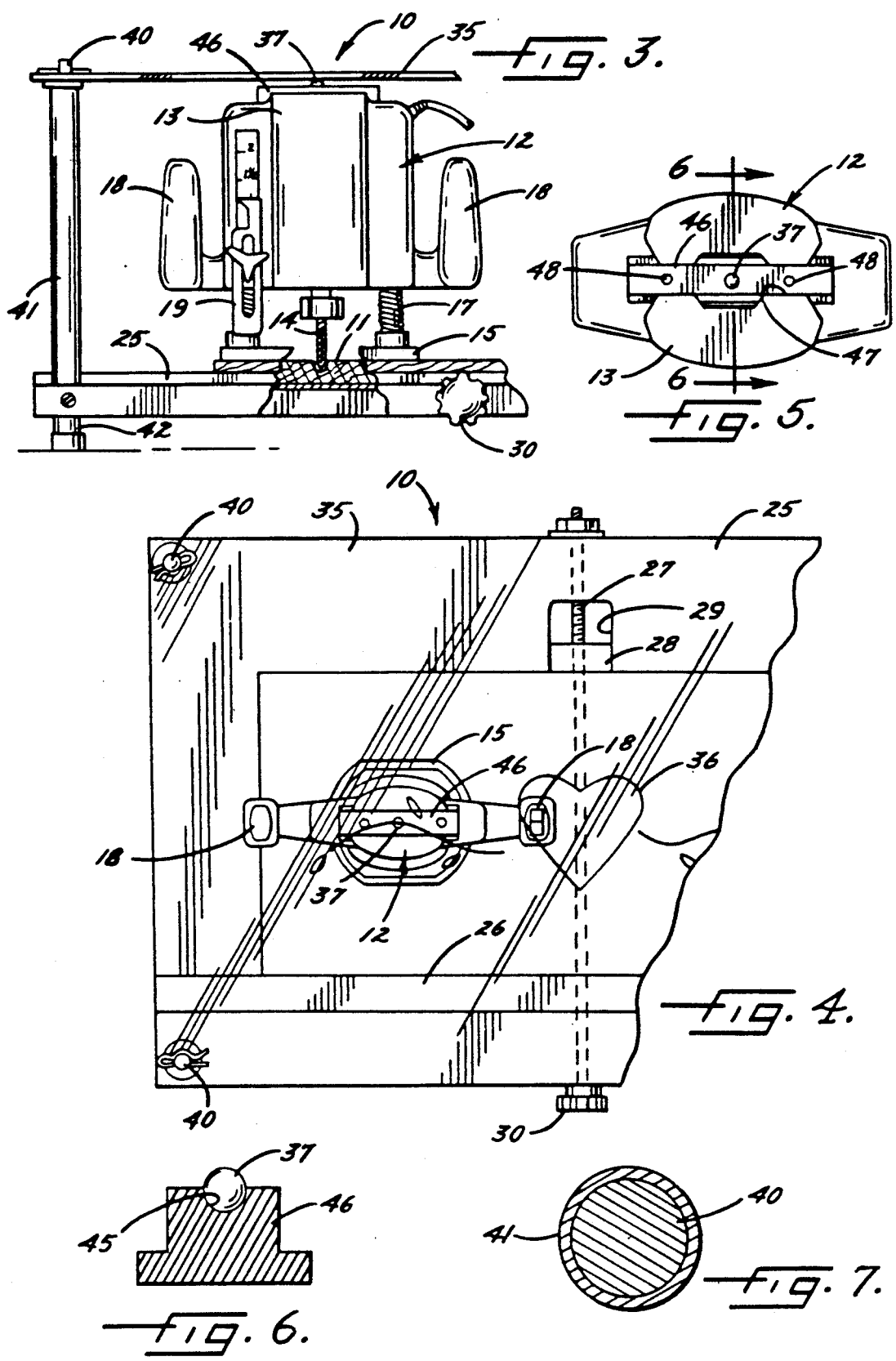

FIXTURE FOR HOLDING A WORKPIECE AND GUIDING A ROUTER OR THE LIKE

BACKGROUND OF THE INVENTION

This invention relates to a fixture for holding a workpiece and for guiding a router as the router is manipulated to cut a predetermined pattern in the workpiece.

Gilfry U.S. Pat. No. 3,099,299 discloses a router guide attachment in which a stylus projects upwardly from the router and into a pattern cutout formed through an overlying template. By keeping the stylus against the edge of the pattern cutout, the router may be guided in such a manner as to cause the router bit to cut the workpiece in conformance with the pattern.

A major drawback of the Gilfry template and with other known templates is that it is necessary to use a different template with a differently shaped cutout for each different design to be cut into a workpiece. Time and skill are required to form different cutouts in multiple templates. Moreover, multiple templates can require significant material and storage space.

SUMMARY OF THE INVENTION

The general aim of the present invention is to provide a new and improved workpiece fixture and router guide having a plate upon which a pattern may be easily sketched, followed during the routing operation, and then erased and replaced with a different sketched pattern.

A more detailed object of the invention is to achieve the foregoing through the provision of an overhead plate which is transparent and upon which a design may be drawn with a washable marker or the like. The router then is simply positioned between the workpiece and the plate and is moved so as to cause a stylus on the router to trace the design on the plate.

A further object is to provide a plate which is capable of moving upwardly and downwardly relative to the workpiece so as to enable the router to be plunged downwardly into and retracted upwardly from the workpiece while keeping the stylus in engagement with the plate.

The invention also resides in the provision of a unique ball stylus for the router These and other objects and advantages of the invention will become more apparent from the following detailed description when taken in conjunction with the accompanying drawings.

BRIEF DESCRIPTION OF THE DRAWINGS

FIG. 3 is a fragmentary view similar to FIG. 2 but shows the router bit plunged into and cutting the workpiece.

FIG. 4 is a fragmentary top plan view of the workpiece fixture and router guide shown in FIG. 2.

FIG. 5 is a top plan view of the router.

FIG. 6 is an enlarged cross-section taken substantially along the line 6—6 of FIG. 5.

FIG. 7 is an enlarged cross-section taken along the line 7—7 of FIG. 2.

DETAILED DESCRIPTION OF THE PREFERRED EMBODIMENT

Figure 1:
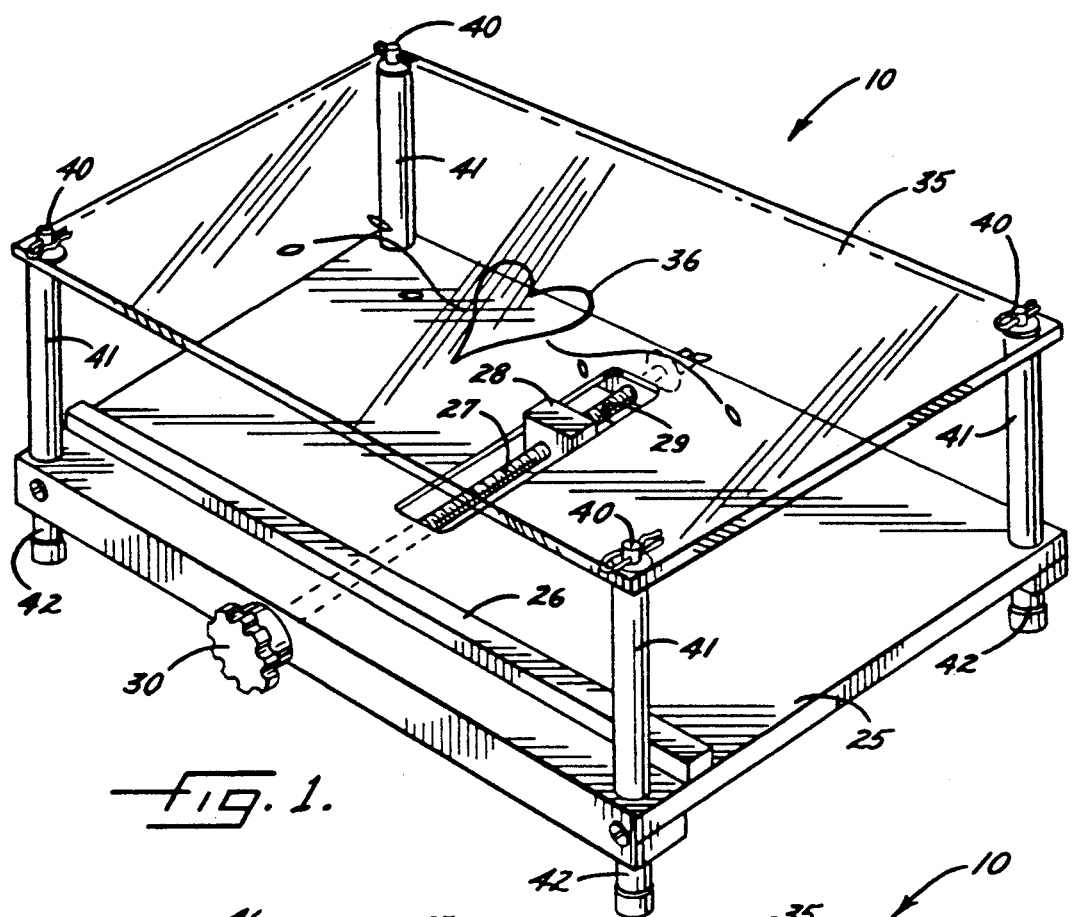
FIG. 1 is a perspective view of a new and improved workpiece fixture and router guide incorporating the unique features of the present invention.

For purposes of illustration, the invention has been shown in the drawings as embodied in a fixture 10 for holding a workpiece 11 (FIGS. 2 to 4) and for guiding a router 12 during cutting of a design in the upper surface of the workpiece by the router. In this instance, the workpiece has been shown as simply being a flat and rectangular wood board but it will be appreciated that workpieces of other shapes and materials may be used in conjunction with the fixture.

The router 12 is a plunge-type router and, for the most part, is of conventional construction. Plungetype routers sold under the trademark Master Mechanic, Skil, Black & Decker and Craftsman are particularly suitable for use with the fixture 10.

Briefly, the router 12 which has been shown includes a housing 13 which encases an electric motor (not shown) for rotating a vertically extending router bit 14 projecting downwardly from the housing. A shoe 15 is located below the housing and supports vertical rods 16 (FIG. 2) which guide the housing for up and down movement. Coil springs 17 surround the rods and urge the housing 13 upwardly to an inactive position shown in FIG. 2 in which the router bit 14 is retracted upwardly from the workpiece 11. By pushing downwardly on handles 18 on the housing, the housing may be slid downwardly along the rods to cause the bit to plunge into and cut the workpiece as shown in FIG. 3. The handles also may be used to maneuver the router horizontally across the workpiece and to cause the bit to cut a design in the workpiece while the shoe 15 slides across the upper surface of the workpiece. A vertically adjustable slide 19 on the housing engages a stop screw (not shown) on the shoe to limit the depth of cut of the bit. When downward pressure on the handles 18 is released, the springs 17 force the housing 13 upwardly and retract the bit 14 from the workpiece 11.

The fixture 10 comprises a lower horizontal base 25 of rectangular shape and having a stop rail 26 (FIG. 1) for locating the workpiece 11. Journaled in the base is a screw 27 which carries a clamp 28 that projects upwardly through an opening 29 in the base. By turning a knob 30 on the forward end of the screw, the clamp may be drawn into engagement with the rear edge of the workpiece in order to clamp the forward edge thereof tightly to the rail.

According to the present invention, a transparent plate 35 is spaced above the base 25 in spaced overlying relation with the workpiece 11 and defines a surface upon which a design pattern 36 (FIG. 1) may be drawn. When the router 12 is placed beneath the plate 35, a stylus 37 (FIGS. 2 to 6) on top of the router housing 13 underlies the pattern 36 and engages the plate. By moving the router horizontally in such a manner as to cause the stylus to trace the pattern, the workpiece may be cut with a shape which is a duplicate of the design of the pattern.

In this particular instance, the plate 35 has the same rectangular shape and size as the base 25 and is made of a hard but clear plastic-like material such as rigid acrylic. Pursuant to the invention, the plate 35 is supported to move upwardly and downwardly relative to the base 25. For this purpose, rods 40 (FIGS. 2 and 7) are fixed rigidly to and depend from the four corners of the plate and are telescoped slidably into tubular posts 41. The latter are fixed to and extend upwardly through the base 25 and their lower end portions form feet 42 for supporting the base and spacing the base above a workbench or the like.

To use the fixture 10, any desired pattern 36 is drawn on the upper surface of the transparent plate 35 with a washable marker or with any other and preferably erasable writing instrument. The pattern may be sketched free-hand, may be drawn with the aid of a stencil or may be copied from an existing design. In the latter case, the existing design (e.g., a picture) is placed against the lower surface of the plate 35 and then is traced on the upper side of the plate with the marker.

Figure 2:
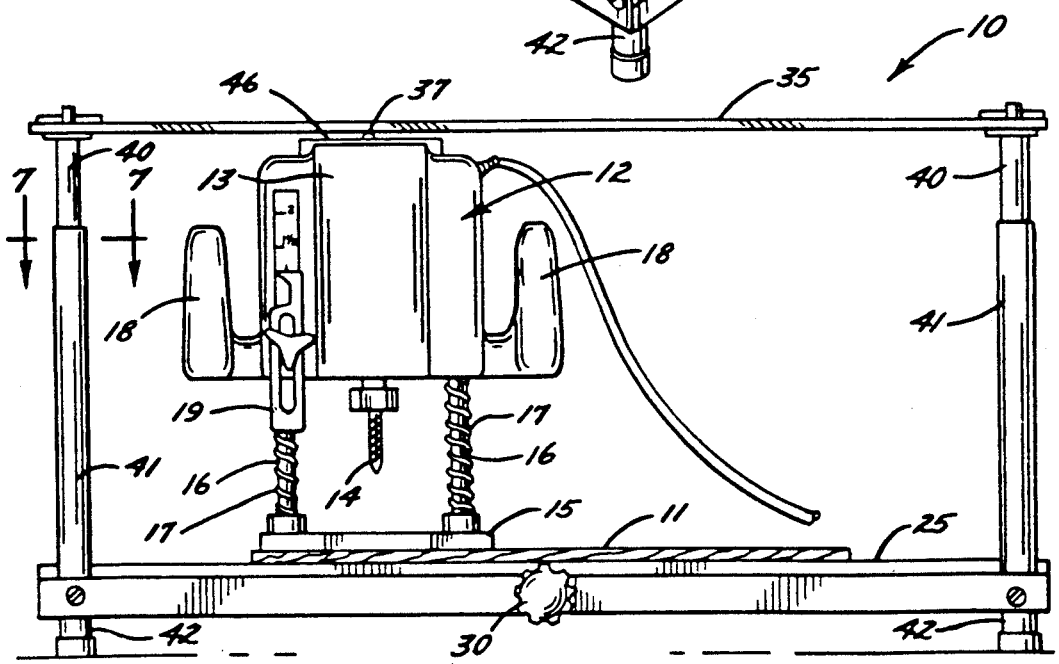
FIG. 2 is an enlarged front elevational view of the fixture and guide illustrated in FIG. 1 and shows a router in position preparatory to the router bit being plunged into the workpiece.

After the pattern 36 has been drawn and the workpiece 11 has been clamped to the base 25 in proper relation to the pattern, the plate 35 is raised upwardly relative to the workpiece as permitted by the telescopic rods 40 and posts 41. The router 12 then is placed on the workpiece, and the plate is lowered into engagement with the stylus 37 as shown in FIG. 2.

By looking through the transparent plate 35, the user may position the stylus 37 at an appropriate starting point beneath the pattern 36 and then plunge the router 12 downwardly into the workpiece 11. As the stylus moves downwardly, so does the plate 35 and thus the stylus remains in engagement with the underside of the plate and in close vertical proximity to the pattern 36. The pattern may be duplicated in the workpiece simply by moving the router horizontally in such a manner as to cause the stylus to follow or trace the pattern. When it is necessary to retract the router bit 14 out of the workpiece, the downward pressure on the handles 18 is released and, as an incident thereto, the springs 17 force the router upwardly. The upwardly moving router acts against the plate 35 and automatically moves the plate upwardly as permitted by the telescopic rods 40 and posts 41. Accordingly, the plate automatically follows the upward and downward movements of the router so as to keep the lower side of the plate in engagement with the stylus 37 and to keep the pattern 36 in close vertical proximity to the stylus.

The stylus 37 is shown in detail in FIG. 6 and the preferred stylus is simply in the form of a spherical steel ball. The ball is captivated in a recess 45 in an adaptor 46 which may be secured releasably to the router housing 13. The adaptor which has been shown is for use with Master Mechanic and Skil routers. It comprises an inverted T-shaped bar which fits into a channel 47 (FIG. 5) in the top of the router housing, the channel normally serving to store a wrench. The adaptor is secured in place by two set screws 48 which thread into tapped holes in the housing. When the adaptor is installed, the ball 37 is automatically centered with respect to the router bit 14. For other brands of routers, the ball 37 may be held in a circular adaptor (not shown) whose lower side carries pressure-sensitive adhesive for securing the adaptor to the top of the router housing 13.

From the foregoing, it will be apparent that the present invention brings to the art a new and improved fixture 10 having a unique transparent plate 35 which allows any design simply to be drawn as a pattern 36 and thereby avoid the need of cutting a pattern into a template. To change patterns, all that one need do is to wash or erase the original pattern from the plate and to draw a different pattern thereon. Since the plate permits the tracing of an existing design placed beneath the plate, the user need not possess any special skill in order to create an artistic pattern. While the pattern has been specifically disclosed as being drawn on the upper surface of the plate, it could, of course, be drawn on the lower surface but this would involve a needless inconvenience.

I claim:

1. A guide for a tool adapted to be moved across a workpiece in order to cut the workpiece, said guide comprising a transparent plate having a visible pattern drawn on one side thereof, and means supporting said plate in spaced relation from said workpiece with said tool being located between said plate and said workpiece.

2. A guide as defined in claim 1 in which said means support said plate for movement toward and away from said workpiece.

3. A fixture for holding a workpiece during cutting of the workpiece by a power-operated tool adapted to be manually moved horizontally to various positions relative to the workpiece and adapted to be manually plunged vertically into and retracted vertically out of the workpiece, said fixture comprising a base having an upper side, means for holding said workpiece in a fixed position on the upper side of said base, a transparent plate spaced above said base in spaced overlying relation with said workpiece and having a visible pattern thereon for assisting in guiding said tool during horizontal movement thereof, and means mounting said plate for up and down movement on said base whereby said plate may be raised upwardly by said tool when the latter is retracted out of said workpiece and may move downwardly with said tool when the tool is plunged into the workpiece.

4. A fixture as defined in claim 3 in which said mounting means comprise posts projecting upwardly from said base, and rods projecting downwardly from said plate and telescoped slidably with said posts.

5. A fixture as defined in claim 4 in which said posts are tubular, said rods being telescoped into said posts.

6. A fixture as defined in claim 3 in which said plate includes an upper surface, said pattern being drawn on said upper surface and being erasable therefrom.

7. The combination of, a router having a housing with an upper end and having a power-rotated router bit extending downwardly from said housing, and a fixture for holding a workpiece during cutting of the workpiece by said router bit, said fixture comprising a base having an upper side, means for holding said workpiece in a fixed position on the upper side of said base, a transparent plate having a lower side spaced above said base in spaced overlying relation with said workpiece, said plate having a visible pattern thereon, said router being located between said plate and said workpiece, a stylus on the upper end of said router housing and engageable with the lower side of said plate beneath said pattern, and means mounting said plate for vertical movement relative to said base whereby said plate may move upwardly and downwardly when said router is moved upwardly and downwardly, respectively.

8. The combination defined in claim 7 in which said stylus is a spherical ball, and an adaptor supporting said ball and secured removably to said housing.

9. The combination defined in claim 7 in which said plate includes an upper surface, said pattern being drawn on said upper surface and being erasable therefrom.

* * * * *